Sept. 26, 1944.   E. S. SCHNEIDER   2,359,006
EGG HANDLING AND CONVEYING APPARATUS
Filed Dec. 23, 1943   2 Sheets-Sheet 2
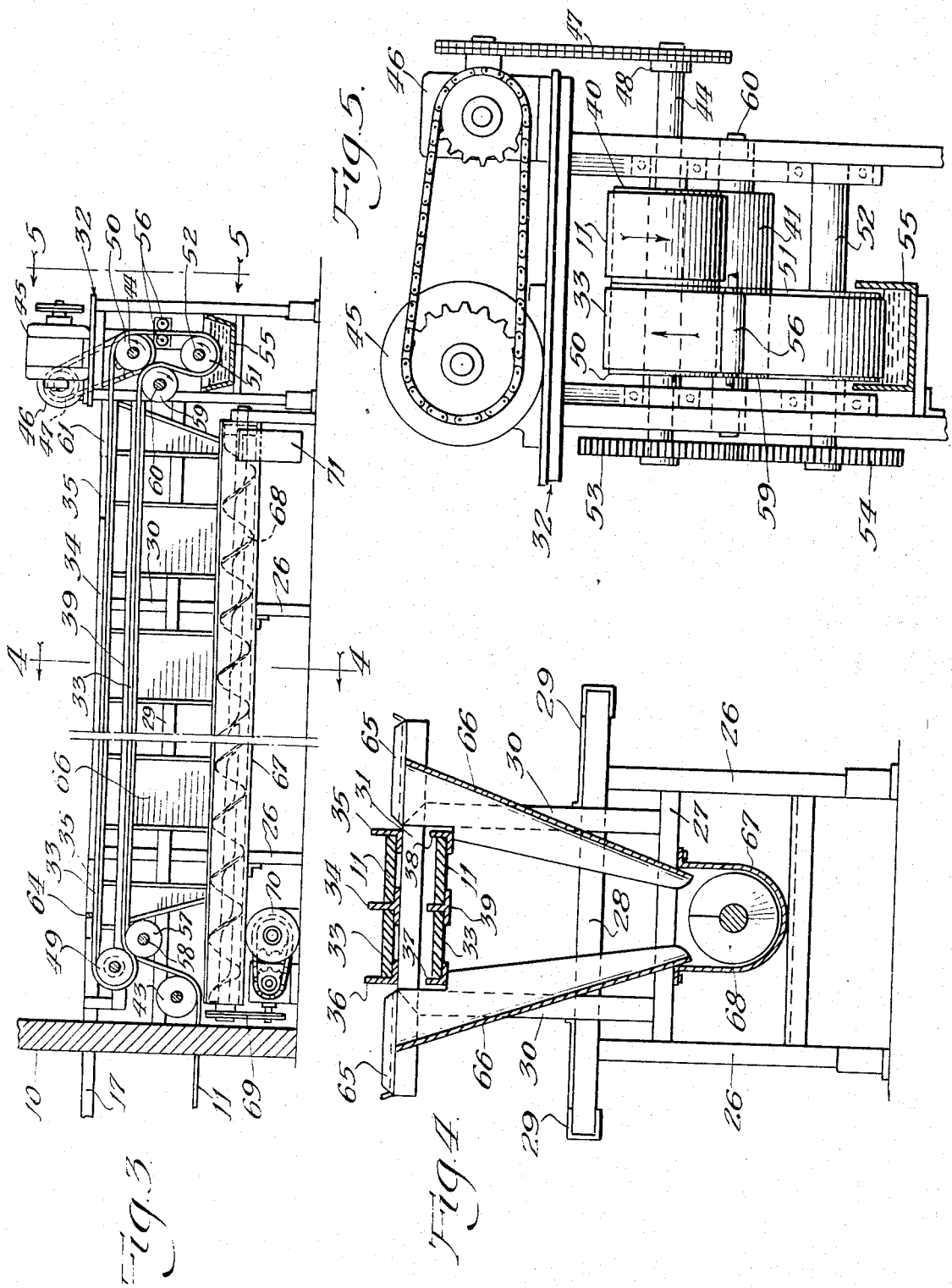
Inventor:
Edward S. Schneider Patented Sept. 26, 1944

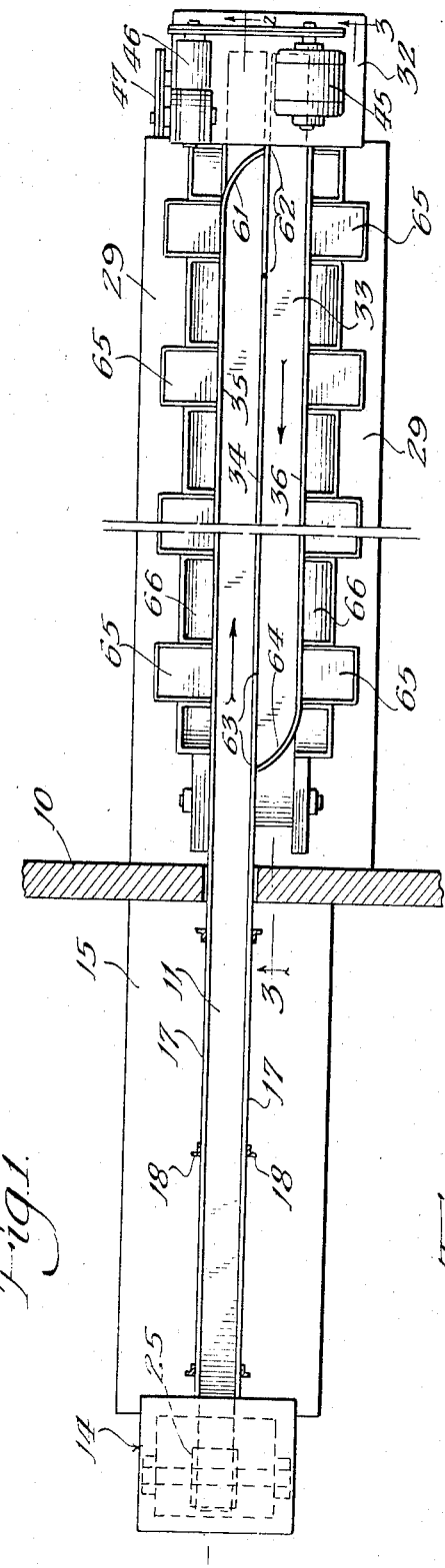

2,359,006

UNITED STATES PATENT OFFICE 2,359,006

EGG HANDLING AND CONVEYING APPARATUS

Edward S. Schneider, Chicago, Ill.

Application December 23, 1943, Serial No. 515,363

5 Claims. (Cl. 146—2)

This invention relates to improvements in egg handling equipment and particularly to a novel conveyor type egg breaking table.

It is an object of my invention to provide a compact unitary structure in the form of a table or work bench, which may be of any desirable or necessary length, and which is adapted to accommodate egg breaking operators in close proximity to each other and on both sides of the bench, the table being provided with necessary shelves and platforms for the accommodation of each operator's implements such as breaker knives, trays, cups and buckets, the table being additionally provided with a relatively elongated, intermediate, longitudinally extending horizontal conveyor means for delivering to the operators, from an adjacent egg candling room, a continuous ample supply of eggs.

Another object of my invention relates to the novel circulatory conveyor means on my table for delivering the eggs to the breaking operators from the candlers which comprises a main horizontal conveyor belt and an adjacent oppositely moving return conveyor belt, the latter being adapted to receive the overflow of the former and in turn to re-circulate any eggs remaining upon it at the terminus of its run, to the main belt. With this arrangement, the return belt acts as an overflow reservoir for any temporary oversupply on the main belt due either to too large a supply furnished by the candlers, or temporary stoppage of work by an operator, and takes care of any eggs that may normally be left on the belt after it passes the last operator without requirement for manual removal, the eggs on the return belt being fully as accessible to the operators as those on the main belt.

Another object relates to the incorporation in my conveyor type egg breaking table of a screw conveyor adjacent the base thereof for carrying away egg shells, the conveyor being provided with a plurality of chute entrances, one extending from adjacent each operator's station, so as to additionally provide a compact construction requiring a minimum amount of space, a minimum amount of operator movement, and an overall arrangement conducive to enhanced efficiency and economy.

Other objects and advantages relate to further details of construction and arrangement of parts which will be apparent from a consideration of the following specification and diagrammatic drawings, wherein:

Figure 1 is a plan view of my novel conveyor type egg breaking table, partly in section.

Figure 2 is a vertical section on the line 2—2 of Figure 1, with certain portion in full and others broken away for clarity of illustration.

Figure 3 is a fragmentary vertical section on the line 3—3 of Figure 1.

Figure 4 is an enlarged vertical section on the line 4—4 of Figure 3.

Figure 5 is a fragmentary enlarged end elevation viewed on the line 5—5 of Figure 3.

Referring to the drawings, the reference numeral 10 indicates a dividing wall separating the egg candling room and the egg breaking room, the main carrier belt 11 passing through an opening 12 therein on its conveying run, and through the opening 13 on its return run.

The apparatus of my invention comprises a candling section having a take-up pulley stand generally indicated as 14 one end, an egg supply or work bench 15 supported by the stand at one end and by suitable standards 16 at the opposed end. Supported above the work bench 15 and intermediate the width thereof so as to accommodate candlers on both sides, is one end portion of the main conveyor trough defined by a pair of horizontal, parallel spaced angle bars 17, 17 for seating and supporting the main carrier belt 11 on its conveying run. Extending above the conveyor trough in the candling room, and preferably secured to and supported thereby, is the candling lamp rack, generally indicated as 18, comprising a plurality of candling lamps 19. It will be understood that the illustration is largely diagrammatic, and thus a plurality of supporting legs 16 may be employed depending on the desired length of the candling room section as a whole, that suitable longitudinal and transverse structural members may be and are employed, although not illustrated, and that the length of the table 15, rack 18 and number of lamps 19 may be varied to suit capacity requirements.

Thus in operation of the candling section, the candlers are provided with a supply of eggs on the table 15, candle them immediately thereabove at the lamps 19, and if satisfactory, place them on carrier belt 11 immediately below the lamps, with a minimum of motion. As indicated, the trough carrying belt 11 is positioned above and intermediate the sides of table 15, so that candlers may operate effectively on both sides of the belt 11. The egg laden belt then moves on through opening 12 to the breaking room, which will be hereinafter more fully described. On its return run to the candling room the belt 11 is supported by means of a suitable trough 20, and passes over roll 21 and is carried by means of roll 22 through a suitable sterilizing bath or chlorinating pan 23 to cleanse the belt, after which the belt rises vertically between the squeeze rolls 24 and then returns to the inception of its horizontal conveying run over the take-up pulley 25.

The egg breaking section of my apparatus, which it will be understood is largely diagrammatically illustrated, may be of any desired length, depending upon desired capacity, and extends from the dividing wall 10 to the drive mechanism stand generally indicated as 32. This section comprises a sub-structure composed of a plurality of supporting standards 26, transverse frame members 27 and 28 and a pair of elongated longitudinally extending aprons or work benches 29, which extend from the wall 10 to the stand 32. The work benches 29 may comprise added structural support members and rest on the standards 26 and outer extensions of the members 28 and may be additionally secured at their inner longitudinal edges to the vertical risers 30. These vertical risers 30 comprise a portion of the superstructure which rises above the aprons 29 from the transverse members 27 and inwardly of the standards 26, and are secured at their uppermost ends by the transverse tie members 31.

Supported on and secured to the tie members 31 and extending longitudinally of the cracking section are a pair of troughs, one for supporting the main conveyor belt 11 in its forward operative passage, and the other for supporting the return belt 33 in its forward operative passage. The troughs are defined by an intermediate inverted T member 34 which provides a common divider wall and support for both belts, an angle bar 35 which is endwise joined to the angle bar 17 of the candling section and therewith forms a continuous outer edge support for the main belt 11 and lateral confinement for eggs conveyed thereon, and an angle bar 36 which forms an outer edge support for the return belt 33 and lateral confinement for eggs recirculated thereon. Positioned parallel to and below the said troughs are similar troughs for supporting the belts 11 and 33 on their return runs formed by the angle bars 37 and 38 and intermediate inverted T bar 39.

The main conveyor belt 11 in its forward passage after being brought into horizontal position over the roll or take-up pulley 25, as previously described in the candling section, moves on the trough members 17, 17 through opening 12 in wall 10, and continues to move between the trough forming members 34 and 35 to pass over the driven pulley 40, after which it is guided in its return passage by means of the rolls 41, 42 and 43 to the roll 21 as previously described, to complete its movement.

The pulley 40 which is keyed to shaft 44 journaled in bearings supported on the stand 32 is driven through the motor 45, its connected speed reducer 46, and the sprocket chain 47 extending from the latter about the sprocket wheel 48 on the end of shaft 44, so as to move the main conveyor belt in its forward conveying run in a direction from the candling section to the cracking section.

The return belt 33, as best illustrated in Figure 3, is trained about the take-up pulley or roll 49 adjacent the wall 10 end portion of the cracking section, and at the opposed end is trained about the idler pulley 50 loosely mounted on shaft 44, and about the driven pulley 51. The driven pulley 51 is keyed to the shaft 52 supported on stand 32 parallel to shaft 44, and is driven through the meshing gears 53 and 54 on the ends of shafts 44 and 52 respectively, so as to drive the return belt 33 in a direction opposite to the direction of movement of main belt 11. The belt 33 in its passage about roll 51 may be caused to be sterilized by means of a chlorinating or the like solution in the pan 55, excess solution being thereafter removed by the squeeze rolls 56 in the upward vertical pass of the belt from driven pulley 51 to idler pulley 50. The return belt 33 is guided in its return run, from pulley 49 to pulley 51, by means of the roll 57, loosely mounted on shaft 58 with roll 42, and roll 59 loosely mounted on shaft 60 with roll 41.

As indicated by the arrows in Figure 1, the main conveyor belt 11 is driven in a direction from the candling section to the cracking section, and the relatively shorter return belt 33 in the opposed direction. An arcuate baffle 61 extends across the main belt trough adjacent terminus of the forward run of belt 11 whereby eggs remaining thereon, as a result of excess supply or for any other reason, will be shifted or shunted onto the return belt 33 through the adjacent opening 62 in the intermediate or common trough defining wall 34. The eggs thus placed on return belt 33 will be conveyed thereby the length of the cracking section, and if any remain thereon at the end of its opposite forward run they are in turn recirculated in a similar manner onto main belt 11, through the opening 63 in the common trough wall 34, by means of the arcuate baffle 64 extending above and across the path of the return belt 33.

Extending laterally of both the trough walls 35 and 36 and spaced at intervals so as to conveniently provide a working station for an egg breaking operator are a plurality of breaking tray stands 65. Thus operators may work on both sides of the two conveyor belts with eggs thereby supplied to them within easy reach, and may conveniently carry out the egg breaking operation by means of conventional knives, separators and pre-collection cups supported on the tray stands 65, the fluid eggs or egg parts to be preserved being then emptied into containers supported on the work benches 29 within like easy reach below.

Disposal of cracked egg shells may also be quickly and conveniently carried out and promptly carried away from the cracking table by means of the shell disposal chutes 66 between and adjacent each breaking implement tray stand 65 with a minimum of motion by the operator. These chutes 66 each extend and open to a common trough 67 secured to the frame transverse members 27 to extend longitudinally of the cracking table section. A suitable screw conveyor 68 is positioned within the trough 67 and is driven by suitable means such as the belt 69 extending from the motor and gear reducer generally indicated as 70, to discharge the cracked shells, which may be additionally crushed by the screw conveyor means to discharge them at the lateral trough conduit 71. From here the cracked and crushed shells may be dropped through a floor opening, collected in barrels or otherwise further conveyed for disposal.

I claim:

1. Egg conveying and handling apparatus of the class described comprising an elongated egg candling table, an endwise adjacent elongated egg cracking table, main egg conveyor means interconnecting and extending longitudinally of said candling and said cracking tables, parallel egg recirculation conveyor means on said egg cracking table in communication adjacent its ends with said main conveyor means, screw conveyor shell disposal means extending longitudinally of the cracking table below said egg conveyor means, and a plurality of shell disposal chutes extending thereto from adjacent said main and recirculation conveyor means.

2. Egg conveying and handling apparatus of the class described comprising an egg candling table section, an egg cracking table section, an elongated horizontal trough extending longitudinally of said table sections, a main conveyor belt in said elongated trough, means for moving said conveyor belt in a direction from said egg candling to said egg cracking table section, a second relatively short trough on said egg cracking table section contiguous with and extending parallel to said elongated trough, a return belt in said shorter trough, means for moving said return belt in the direction opposite to that of the main conveyor belt, a baffle extending transversely of said elongated trough adjacent its cracking table terminus whereby eggs remaining on the main conveyor belt at the end of its forward passage will be shunted onto said return belt through an opening provided thereat in the contiguous walls of said troughs, and a baffle extending transversely of said shorter trough adjacent its opposed end whereby eggs remaining on said return belt at the end of its forward passage will be shunted onto said main conveyor belt through a second longitudinally spaced opening provided thereat in the contiguous walls of said troughs.

3. Egg conveying and handling apparatus of the class described comprising an egg candling table including candling lamps supported thereon, an adjoining egg cracking table, an elongated horizontal trough extending longitudinally of and interconnecting said tables, a main conveyor belt in said elongated trough, means for moving said conveyor belt in a direction from said egg candling to said egg cracking table, a second relatively short trough on said egg cracking table extending parallel to said elongated trough and having a defining wall common therewith, a return belt in said shorter trough, means for moving said return belt in the direction opposite to that of the main conveyor belt, an arcuate baffle extending transversely of said elongated trough adjacent its cracking table terminus whereby eggs remaining on the main conveyor belt at the end of its forward passage will be shunted onto said return belt through an opening provided thereat in the common wall of said troughs, an arcuate baffle extending transversely of said shorter trough adjacent its opposed end whereby eggs remaining on said return belt at the end of its forward passage will be shunted onto said main conveyor belt through a second longitudinally spaced opening provided thereat in the common wall of said troughs, a plurality of longitudinally spaced egg breaking implement tray stands extending laterally of both of said troughs in said cracking table section and an elongated shelf extending longitudinally of each side of the cracking table and below said tray stands.

4. Egg conveying and handling apparatus of the class described comprising an egg candling table, an endwise adjacent egg cracking table, an elongated horizontal trough extending over both of said tables, an endless main conveyor belt supported in said elongated trough in its forward operative passage, means for moving said conveyor belt in a direction from said egg candling to said egg cracking table in said trough and for returning it therebelow, a second relatively short trough on the cracking table extending parallel to the elongated trough and having a lateral defining wall common therewith, an endless return belt supported in said short trough on its forward passage, means for moving said return belt in its trough in the direction opposite to that of the main conveyor belt and for returning it therebelow, an arcuate baffle extending transversely of said elongated trough adjacent its cracking table terminus whereby eggs remaining on the main conveyor belt at the end of its forward passage will be shunted onto said return belt through an opening provided thereat in the common wall of said troughs, an arcuate baffle extending transversely of said shorter trough adjacent its opposed end whereby eggs remaining on said return belt at the end of its forward passage will be shunted onto said main conveyor belt through a second longitudinally spaced opening provided thereat in the common wall of said troughs, and means interposed in the return paths of said belts for subjecting them to liquid cleansing.

5. Egg conveying and handling apparatus of the class described comprising an egg candling table, an egg cracking table, an elongated horizontal trough extending longitudinally of and interconnecting said tables, a main conveyor belt in said elongated trough, means for moving said conveyor belt in said trough in a direction from said egg candling to said egg cracking table, a second relatively short trough on said egg cracking table contiguous with and extending parallel to said elongated trough, a return belt in said shorter trough, means for moving said return belt in its said trough the direction opposite to that of the main conveyor belt, an arcuate baffle extending transversely of said elongated trough adjacent its cracking table terminus whereby eggs remaining on the main conveyor belt at the end of its forward passage will be shunted onto said return belt through an opening provided thereat in the contiguous walls of said troughs, an arcuate baffle extending transversely of said shorter trough adjacent its opposed end whereby eggs remaining on said return belt at the end of its forward passage will be shunted onto said main conveyor belt through a second longitudinally spaced opening provided thereat in the contiguous walls of said troughs, a plurality of longitudinally spaced egg breaking implement tray stands extending laterally of both of said troughs on said cracking table, cracked shell receiving chutes opening to and interposed between said trays and inclining therefrom and opening therebelow to a common trough extending longitudinally of the cracking table, and screw conveyor means within said common trough for continuously moving cracked shells therethrough.

EDWARD S. SCHNEIDER.